UNITED STATES PATENT OFFICE 2,602,094

RUBBER HYDROCHLORIDE FILM

Marion D. Coulter, Cuyahoga Falls, Ohio, assignor to Wingfoot Corporation, Akron, Ohio, a corporation of Delaware No Drawing. Application March 5, 1951,
Serial No. 214,021

2 Claims. (Cl. 260—735)

This invention relates to rubber hydrochloride film which contains a small amount of a piperonyl alkylcarbityl ether, or, more generally, a formula of the compound

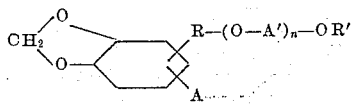

in which R is an alkylene radical of 1 to 8 carbon atoms, A is a substituent from the group consisting of hydrogen and alkyl radicals containing 1 to 8 carbon atoms, A' is an alkylene radical having 1 to 8 carbon atoms, R' is a substituent selected from the group consisting of alkyl, cycloalkyl, aryl, aralkyl, alkylyl and carbocyclic radicals, and $n$ is an integer from 1 to 3. Thus, for instance, R may be methylene, ethylene, propylene or butylene; A may be hydrogen, methyl, ethyl, propyl, butyl, pentyl, hexyl, heptyl, or octyl, including both straight chain and branched chain compounds; A' may be methylene, ethylene, propylene, butylene, pentylene, hexylene, heptylene or octylene; and R' may be methyl, ethyl, propyl, butyl, pentyl, hexyl, heptyl or octyl (including both straight chain and branched chain groups), cyclohexyl, cyclopentyl, allyl, methallyl or crotonyl, etc. The stabilizers include monoglycol and polyglycol ethers, for instance ethers obtained from monoethylene glycol and polyethylene glycols including higher alkylene glycols and polyglycols which include, for instance, diethylene glycol monobutyl ether, ethylene glycol monomethyl ether, diethylene glycol ethyl ether, triethylene glycol ethyl ether, ethylene glycol butyl ether, as well as the hexyl and octyl ethers of ethylene and diethylene glycol, and ethers of propylene and hexylene glycol, etc. Ordinarily the alkylene linkage between the benzene ring and the first oxygen of the ether chain will be methylene.

Rubber hydrochloride film has been used extensively in packaging and has been used for the manufacture of garment bags, draperies, etc. One objection to its more general use is its tendency to become brittle on exposure to light. The effect of light is more noticeable in thin films less than .001 inch thick but is appreciable in films up to, for example, .0025 inch. The thinnest available films are generally not more than .0002 inch thick, so that it may be said that the invention relates to films varying from a thickness of .0002 inch to films .0025 inch thick.

It has been found that the stabilizer of this invention retards or inhibits such embrittlement of rubber hydrochloride film, regardless of the use to which the film is put. Small amounts have little noticeable effect, but from 1 to 10 per cent—based on the weight of the rubber hydrochloride in the film—can be used to advantage. The film may contain plasticizers, etc., such as butyl stearate, dibutyl phthalate, butadiene-acrylonitrile copolymer, butyl sebacate, etc.

The preferred stablizer of this invention is butyl-carbityl (6-propyl piperonyl) ether which has the formula

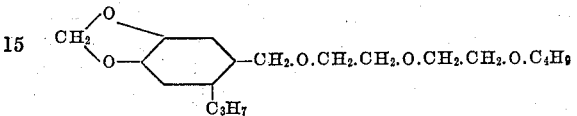

Another name for this compound is (3,4-methylene-dioxy-6-propyl-benzyl) (butyl diethylene glycol) ether. Other stabilizers include, for instance, methylcarbityl piperonyl ether, octylcarbityl piperonyl ether, methylcarbityl(6-ethyl piperonyl) ether, pentylcarbityl(6 - butylpiperonyl),ether ethylcarbityl(6-ethyl piperonyl) ether, cyclohexylcarbityl(6-octyl piperonyl) ether, benzylcarbityl(6-propyl piperonyl) ether, naphthylcarbityl(6-butyl piperonyl) ether, phenylcarbityl(6 - propyl piperonyl) ether, tolylcarbityl(6-propyl piperonyl) ether, ethylene glycol-phenyl (piperonyl) ether, etc.

The stabilizer is added to a cement or solution of rubber hydrochloride in any suitable solvent. Ordinarily benzene will be employed, but chloroform, etc. may be used. The film is then prepared in any usual way.

A series of rubber hydrochloride cements was made up in benzene using 2.5 parts of butyl stearate in each and a varying amount of butylcarbityl(6-propyl piperonyl)ether. In the following table this is identified simply as "stabilizer." The various compositions were cast as films which on removal of the benzene were each .001 inch thick. The butyl stearate was used to plasticize the film. Modulus, tensile, elongation and tear tests were run on the various films before aging. The test results are given in the table. These films were tested in a fadeometer and the hours exposure of each film before embrittlement is recorded in the table. The last line of the table gives the percentage improvement noted in the respective stabilized films as compared with the film containing no stabilizer.

Table 1

|  | Control | 1st Test | 2nd Test | 3rd Test |
|---|---|---|---|---|
| Rubber hydrochloride (parts) | 100 | 100 | 100 | 100 |
| Butyl stearate (parts) | 2.5 | 2.5 | 2.5 | 2.5 |
| Stabilizer (parts) |  | 2 | 5 | 10 |
| 50% Modulus (lbs./sq. in.) | 3,820 | 3,600 | 3,470 | 2,760 |
| 100% Modulus (lbs./sq. in.) | 3,960 | 3,660 | 3,560 | 3,000 |
| Tensile (lbs./sq. in.) | 3,960 | 3,660 | 3,580 | 3,120 |
| Elongation (per cent) | 100 | 100 | 150 | 340 |
| Tear, Elmendorf (grams) | 80 | 80 | 160 | 160 |
| Fadeometer (hours) | 67 | 100 | 116 | 145 |
| Fadeometer (percent of control) |  | 149 | 173 | 216 |

In another test a film containing 2.5 parts of the same stabilizer and 2.5 parts of butyl stearate was compared with a control which contained no stabilizer and 5 parts of butyl stearate. The larger amount of butyl stearate was used in the control to compensate, at least approximately, for the plasticizing effect of the stabilizer. Different samples of these films were tested at different times of the year in a window having western exposure. Tests made when the days were shorter required more time than those made when the days were longer. For each test, the length of time required to embrittle the films was noted and this is recorded in the following table. In the table the per cent improvement over the control is also noted.

Table 2

|  | Control | Test Film | Improvement |
|---|---|---|---|
|  | days | days | percent |
| 1st test | 31 | 53 | 171 |
| 2nd test | 14 | 21 | 150 |
| 3rd test | 11 | 18 | 164 |
| 4th test | 12 | 21 | 175 |

In another series of tests, films of given compositions were tested in a fadeometer and in the west window. The compositions of these films and the results of the tests are recorded in the following table:

Table 3

| Film | Control | Test No. 1 | Test No. 2 | Test No. 3 |
|---|---|---|---|---|
| Composition: |  |  |  |  |
| Rubber hydrochloride (parts) | 100 | 100 | 100 | 100 |
| Butyl stearate (parts) | 10 | 7.5 | 5.0 | 2.5 |
| Stabilizer (parts) |  | 2.5 | 5.0 | 7.5 |
| Fadeometer (hours): | 35 | 46 | 60 | 60 |
| Percent of Control |  | 131 | 171 | 171 |
| Days in west window: | 11 | 25 | 32 | 37 |
| Percent of Control |  | 227 | 291 | 336 |

Other film was similarly tested with the following results:

Table 4

| Film | Test | Control |
|---|---|---|
| Composition: |  |  |
| Rubber hydrochloride (parts) | 100 | 100 |
| Butyl stearate (parts) | 7.5 | 10 |
| Stabilizer (parts) | 2.5 |  |
| Fadeometer (hours): | 45 | 38 |
| Percent of Control | 118 |  |
| Days in west window: | 22 | 16 |
| Percent of Control | 138 |  |

Although the recorded tests relate only to the preferred compound, other stabilizers having a formula coming within the general formula may be employed. The above test results show that the stabilizer prolongs the life of the film and has some plasticizing effect. The total effect depends upon the amount of stabilizer employed.

What I claim is:

1. Rubber hydrochloride film which contains a small amount of a compound having the formula

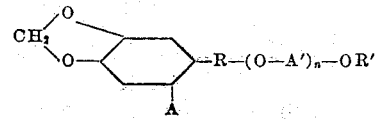

in which R is an alkylene radical of 1 to 8 carbon atoms; A is a substituent from the group consisting of hydrogen and alkyl radicals of 1 to 8 carbon atoms; A' is an alkylene radical of 1 to 8 carbon atoms; R' is a substituent from the group consisting of alkyl, cycloalkyl, aryl, aralkyl, alkylyl and carbocyclic radicals; and $n$ is an integer from 1 to 3.

2. Rubber hydrochloride film which contains a small amount of (3,4-methylene-dioxy-6-propyl-benzyl) (butyl diethylene glycol) ether.

MARION D. COULTER.

REFERENCES CITED

The following references are of record in the file of this patent:

UNITED STATES PATENTS

| Number | Name | Date |
|---|---|---|
| 2,166,604 | Meyer | July 18, 1939 |
| 2,349,036 | Ferner | May 16, 1944 |
| 2,485,681 | Wacks | Oct. 25, 1949 |